United States Patent [19]
Diakoulas

[11] Patent Number: 5,915,609
[45] Date of Patent: Jun. 29, 1999

[54] BELT HARNESS AND SUPPORT

[76] Inventor: John E. Diakoulas, 132 Orthridge Rd., Lutherville, Md. 21093

[21] Appl. No.: 08/927,208

[22] Filed: Sep. 11, 1997

[51] Int. Cl.⁶ ....................................................... A45F 3/02
[52] U.S. Cl. ........................... 224/626; 224/625; 224/929; 224/930
[58] Field of Search ..................... 224/626, 625, 224/607, 613, 655, 929, 930, 235, 236, 237, 676, 677; D3/218

[56] References Cited

U.S. PATENT DOCUMENTS

| D. 384,200 | 9/1997 | Caldwell | D3/218 |
|---|---|---|---|
| 524,104 | 8/1894 | Doherty | 224/626 |
| 2,372,971 | 4/1945 | Moore | 224/626 |
| 2,676,738 | 4/1954 | Herrick | 224/930 |
| 4,485,946 | 12/1984 | Liautaud et al. | |
| 4,569,465 | 2/1986 | O'Farrell | |
| 4,722,464 | 2/1988 | Wright | 224/930 |
| 4,834,274 | 5/1989 | Johnson | |
| 4,878,606 | 11/1989 | Miller | |
| 4,901,852 | 2/1990 | King | 224/930 |
| 5,392,973 | 2/1995 | Benson | 224/236 |
| 5,624,065 | 4/1997 | Steffe | 224/625 |

Primary Examiner—David J. Walczak

[57] ABSTRACT

A belt harness for carrying and securing a portable radio apparatus includes a pelvic belt secured about the body of a user. A receptacle compartment is secured to the pelvic belt. The receptacle compartment is adapted for holding a receiver of a communication device. The belt harness includes a shoulder strap having first and second portions. The first and second portions of the shoulder strap are secured to the pelvic belt at opposing locations so that pelvic belt is supported about the body of a user. A channel portion is disposed along an outer surface of the shoulder strap for securing features of the communication device.

9 Claims, 3 Drawing Sheets

5,915,609

BELT HARNESS AND SUPPORT

FIELD OF THE INVENTION

This invention relates generally to belt harnesses for supporting and carrying a portable radio apparatus about the body of a user. More specifically, this invention relates to a belt harness for supporting and carrying a dual instrument communication apparatus, in which the receiver and transmitter may be carried and secured separately on the belt harness.

BACKGROUND OF THE INVENTION

In recent years, there has been wide use of portable radio apparatus for communication. A standard type of device used is a portable communication device, in which the user transmits and receives messages in the same instrument. The device is sized to be held by the user, and typically includes an antenna for receiving messages. These devices have been used by people who desire to communicate with another person within a short distance, yet cannot do so without the aid of the device. For instance, these devices are handy for police officers who when apprehending a criminal, may need to communicate with their partners for assistance. Similarly, ski patrols may use these devices to communicate among each other to insure the safety of the skiers on the mountain. Because the user is often in transit when using the device, belt holders and harnesses have developed to carry such devices.

An example of a belt holder is a type worn by police officers in which a receptacle compartment is secured to a belt. A problem with this type of holder is that the device is not easily accessible. A user must reach into the compartment and remove the device before engaging it. Further, the antenna of the portable apparatus may restrict the movement of the user. The antenna may extend above the belt line of the user, obstructing his or her freedom of movement. Finally, the belt is typically made from a thick leather material. This prevents other types of instruments such as pagers and the like, from being strapped or clipped to the belt.

Another example of a belt holder is exemplified in U.S. Pat. No. 4,485,946. The belt holder includes a belt fastener and a receptacle housing in which the latter is pivotally mounted to the belt fastener. The belt holder improves the mobility of the user and the ease by which the radio apparatus may be accessed and engaged. However, a user can not easily access the radio apparatus while in transit. In order to operate the device, it must be removed from the receptacle housing and subsequently engaged. Thus, the apparatus may be dropped while attempting to communicate in transit, resulting in damage or loss.

Another type of portable radio apparatus for communicating is one in which the transmitter and receiver are separate instruments. Typically, the receiver is the larger of the two instruments, and includes the main operative features of the device, including a volume button and a channel selector. The receiver also includes an antenna for receiving messages. In contrast, the transmitter is a smaller, lightweight instrument, and is used only to transmit the messages. The transmitter is connected to the receiver by wires. The apparatus is designed so that the larger receiver may be placed at a discrete location, while the small transmitter may be secured at a place convenient for the user to communicate. That is, because the user communicates by projecting his or her voice into the transmitter, the transmitter is usually secured at a location proximate to a user's mouth. Typically, the transmitter includes a clipping mechanism which allows the lightweight transmitter to be clipped to a user's clothing.

An advantage to this type of communication device is that a user need not remove or hold a heavy weight transceiver in order to communicate, allowing for easier communication, especially while in transit. The user can communicate by simply pressing a button on the transmitter to send the message without having to remove the instrument. Thus, a user's hands remain free to engage in other activities, without the hassles associated with losing the communication device.

While this type of communication device offers advantages over the single instrument communication device, there have been problems and disadvantages associated with its use. A problem associated with its use is that the wires connecting the transmitter to the receiver may potentially obstruct the freedom of movement of the user. For instance, the arms of the user may become entangled in the wires. Further, the chances of the user's arms becoming entangled in the wires are greatly increased when the user attempts to communicate with the device while in transit.

Similarly, the mechanism included on the transmitter for clipping the transmitter to a user's clothing may be unintentionally released. For instance, because the jaws of the clipping mechanism may not penetrate through a user's clothing, the transmitter may be easily pulled off a user's clothing. This becomes extremely burdensome especially when attempting to communicate while in transit.

The prior art harnesses, while providing some utility for securing a single instrument communication device, are inadequate for the dual instrument communication device described above.

Thus, there is a need in the art for a belt harness for carrying and securing a dual instrument communication device to facilitate communication without removing or moving the transmitter and receiver from their respective locations.

SUMMARY OF THE INVENTION

A principal object of the present invention is to provide a belt harness for carrying and securing a portable communication device to facilitate communication while the user is in transit.

The above object is achieved according to the present invention.

A belt harness for carrying and securing a portable radio apparatus includes a pelvic belt secured about the body of a user. A receptacle compartment is secured to the pelvic belt. The receptacle compartment is adapted for holding a receiver of a communication device. The belt harness includes a shoulder strap having first and second portions. The first and second portions of the shoulder strap are secured to the pelvic belt at opposing locations so that pelvic belt is supported about the body of a user. A channel portion is disposed along an outer surface of the shoulder strap for securing features of the communication device.

A belt harness for carrying and securing a portable radio apparatus about a body of a user is provided. The belt harness includes a pelvic belt for securement about the body of the user. A receptacle compartment is secured to the pelvic belt. The receptacle compartment includes a front vertical portion, a rear vertical portion, two side vertical portions, and a base portion. The front vertical portion is made from a clear plastic material so that the contents within the receptacle compartment may be manipulated.

A method for securing a portable radio apparatus within a harness includes the step of providing a belt harness including a pelvic belt, a shoulder strap attached to the belt, a receptacle compartment secured to the belt, and a channel portion secured to a front portion of the shoulder strap. A receiver of a communication device is positioned within the receptacle compartment so that the operative features of the receiver may be manipulated through a front plastic material of the receptacle compartment. Wires of the communication device are secured within the channel portion of the shoulder strap. A transmitter of the communication device is secured to a portion of the belt harness above the channel portion so that the transmitter is proximate to a user's mouth.

BRIEF DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF THE INVENTION

Figure 1:
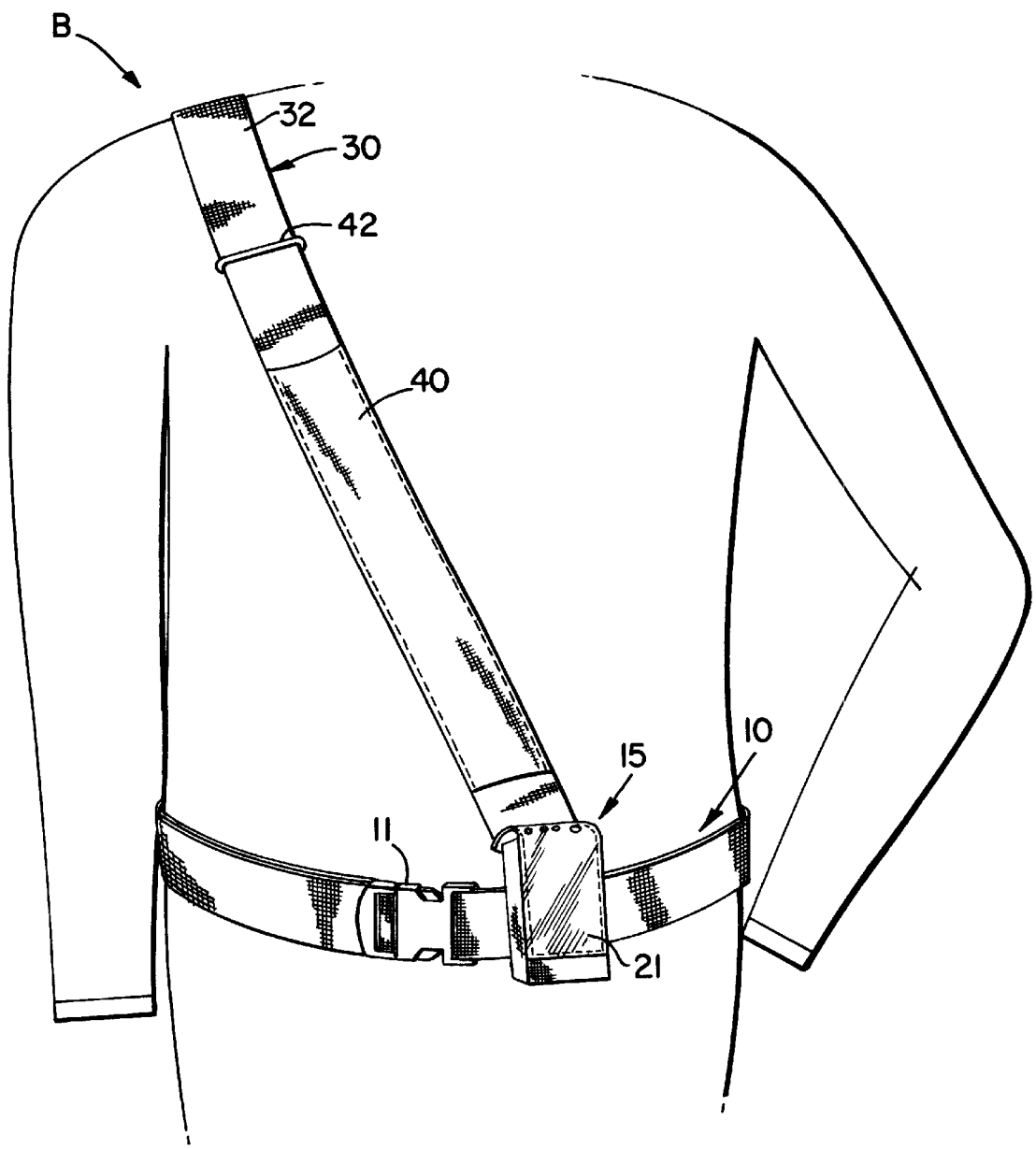
FIG. 1 is a front elevational view of the belt harness of the present invention.

As best illustrated in FIG. 1, belt harness B is provided for carrying a portable communication device, specifically a device in which the receiver and transmitter are dual instruments. Belt harness B includes a pelvic belt 10 having belt securement 11, which is adapted to be secured about the body of a user. Belt securement 11 may be a buckle or any type of locking mechanism which is used to secure belts.

In the preferred embodiment, pelvic belt 10 is made from acrylic polyester. Acrylic polyester is durable, water resistant, yet lightweight. In addition, the use of acrylic polyester allows for a belt 10 to be thin enough to allow other types of instruments, such as pagers, to be clipped on the belt.

Figure 2:
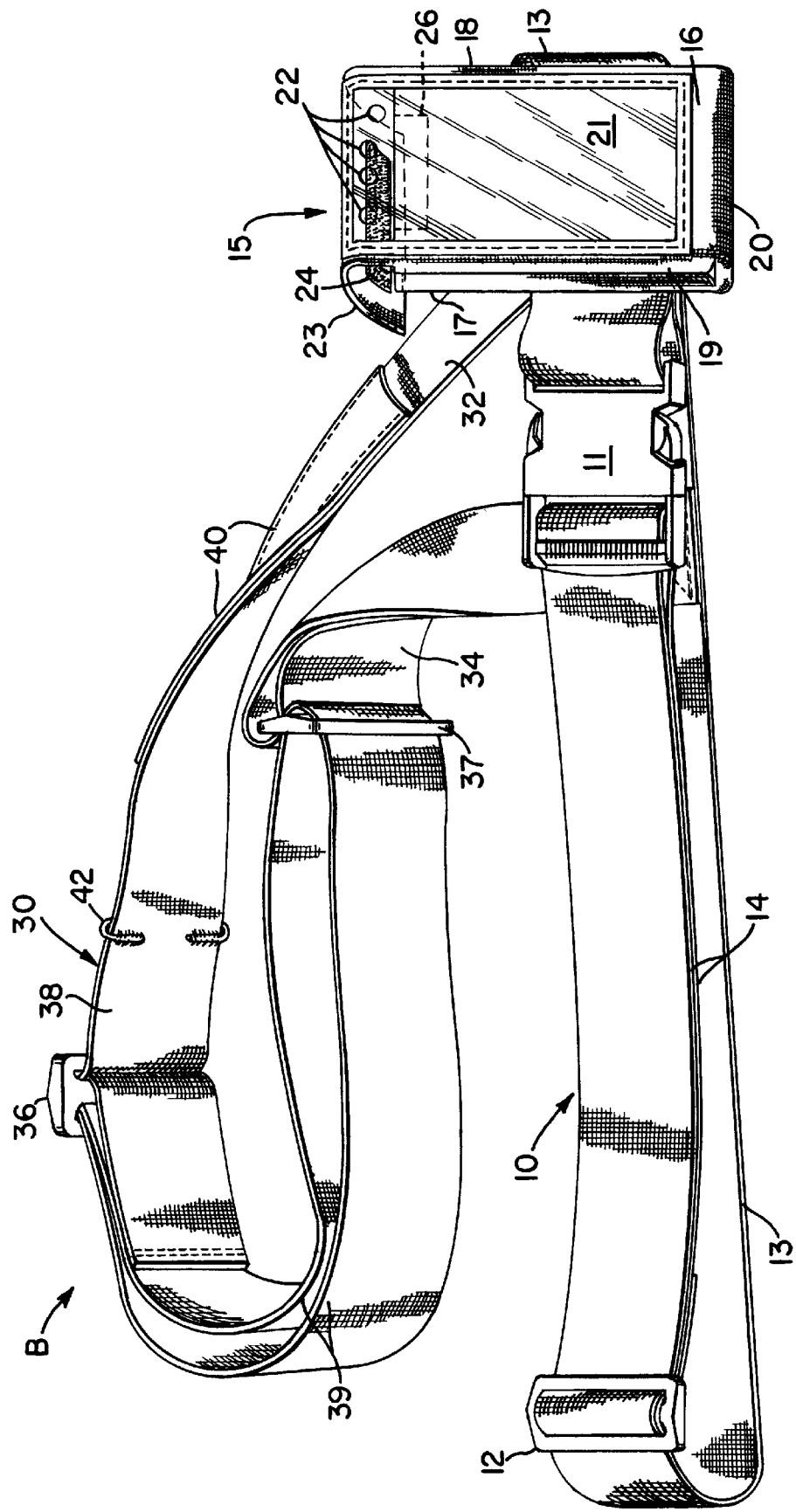
FIG. 2 is a perspective view of the belt harness of the present invention.

With reference now to FIG. 2, pelvic belt 10 includes belt adjustment 12 in which pelvic belt 10 may be adjusted to fit users of various sizes. Belt adjustment 12 is a standard adjustment mechanism used to accommodate users of various sizes. Pelvic belt 10 is adjusted through belt adjustment 12 such that a single strap 13 of pelvic belt 10 loops into a double strap 14.

Secured to pelvic belt 10 is a receptacle compartment 15, which is adapted for carrying a receiver of a portable communication device. Pelvic belt 10 may be adjusted so that it and receptacle compartment 15 remain stationary about the body of the user. Receptacle compartment 15, like pelvic belt 10, is preferably made from acrylic polyester, but may be made from any durable material. In the preferred embodiment, receptacle compartment 15 is secured to pelvic belt 10 by stitching or other permanent attachment means.

Receptacle compartment 15 is generally rectangular in shape but may be any shape which can accommodate a receiver of a communication device. For example, receptacle compartment 15 may be cylindrical. With reference to FIG. 2, receptacle compartment 15 is preferably rectangular in shape, and includes front and back vertical portions 16 and 17, two side vertical portions 18 and 19, and a base 20.

Front vertical portion 16 of receptacle compartment 15 is made of a clear plastic material 21. This material allows for a user to push operative buttons on the receiver through the plastic material 21. In addition, a plurality of apertures 22 are disposed on an upper surface of the front vertical portion 16 of receptacle compartment 15. These apertures 22 allow for penetration of various operative features of the receiver, for access by the user, while the receiver remains secured in the receptacle compartment 15. In the preferred embodiment, there are four apertures, but there may be as many as are required. The structure of receptacle compartment 15 allows for a user to access the main features of the receiver, without having to remove the receiver from the receptacle compartment 15. Thus, a user can, for example, change channels or adjust the volume without having to remove the receiver.

Receptacle compartment 15 includes a flap or lid 23 which covers and secures the receiver when placed in the receptacle compartment 15. In the preferred embodiment, flap 23 is secured by way of Velcro portion 24 which is located on the inner surface of flap 23. Velcro portion 24 is engageable with a respective Velcro portion 26 which is located on an upper portion of the back vertical portion 17 of receptacle compartment 15. Thus, flap 23 is brought inwardly towards the body of the user in order to secure the receptacle compartment 15. When complimentary Velcro portions are engaged, flap 23 is flush against the body of the user. However, it should be understood that the flap 23 may be secured to receptacle compartment 15 by any other suitable securement means, for instance, by buttons, snaps, draw strings, or the like. While a lid 23 is preferable for retaining the receiver within receptacle compartment 15, receptacle compartment 15 may be shaped and made of a material such that the receiver may be maintained within the compartment 15 without the necessity of a lid 23. The elimination of the need for a lid 23 also eliminates the need for apertures 22, as the features of the receiver which protrude from the compartment 15 may now do so through the open top of the compartment 15. In addition, lid 23 may also be secured away from the body, at either side, or secured in any other comparable way.

For further securement, belt harness B includes shoulder strap 30. Shoulder strap 30 includes front and back portions 32 and 34. Front portion 32 is secured to pelvic belt 10 at a front location of pelvic belt 10, while the back portion 34 of shoulder strap 30 is secured in a back location. In this way, because the shoulder strap 30 is secured at opposing locations, pelvic belt 10 may be suspended and supported on or across the user's body.

In the preferred embodiment, shoulder strap 30 diagonally traverses the torso of the user to prevent movement of pelvic belt 10 about the lower torso of the user. Not only does shoulder strap 30 act to suspend pelvic belt 10 providing extra support, it also prevents pelvic belt 10 from shifting about the body of the user. Shoulder strap 30 may be secured to pelvic belt 10 by stitching or other permanent attachment means. In the preferred embodiment, shoulder strap 30 is made from acrylic polyester. However, shoulder strap 30 may be made from any other comparable material.

In addition, shoulder strap 30 includes adjustment mechanisms 36 and 37 which function to vary the length of the shoulder strap 30 to accommodate users of various sizes. Adjustment mechanisms 36 and 37 are a standard type of adjustment mechanism which allow a single strap 38 to be looped into a double strap 39.

Disposed on an outer surface of front portion 32 of shoulder strap 30 is a channel portion 40. Channel portion 40 may be made from the same material as shoulder strap 30 and is secured to shoulder strap 30 by stitching or other permanent attachment means. That is, a piece of fabric is sewn along the side edges of the front portion 32 of shoulder strap 30 to form channel portion 40. Strategically, the front portion 32 of the shoulder strap 30 should be axially aligned with receptacle compartment 15. This permits the features of the receiver protruding from compartment 15 to be received and nested in the channel portion 40, thus maintaining a user's freedom of motion.

For example, an antenna of a receiver which protrudes from an aperture 22 may be inserted in the channel portion 40, thus providing optimum freedom of movement for the user. Similarly, the wire connecting a receiver to a transmitter may be nested away in channel portion 40, avoiding possible entanglements during operation and use.

Disposed proximate to and just above channel portion 40 is strap 42. Strap 42 is provided to facilitate attachment or the clipping of the transmitter to belt harness B. Typically, a transmitter will include a clipping mechanism which allows for the transmitter to be clipped to a user's clothing. However, the jaws of the clip may not be able to completely penetrate a user's clothing. This may result in the transmitter being inadvertently removed from the user. The strap 42 acts as a support from which the clipping mechanism may be secured. The strap 42 should be thin enough such that the jaws of the clipping mechanism contained on a transmitter may be completely secured, and is preferably positioned horizontally across the width of the shoulder strap 30. However, it should be understood that the strap 42 may be oriented in any way, as is desired. The strap 42 is made from a thin piece of fabric, preferably of a durable material, such as acrylic polyester. The strap 42 is attached to shoulder strap 30 by stitching or other permanent attachment means.

Figure 3:
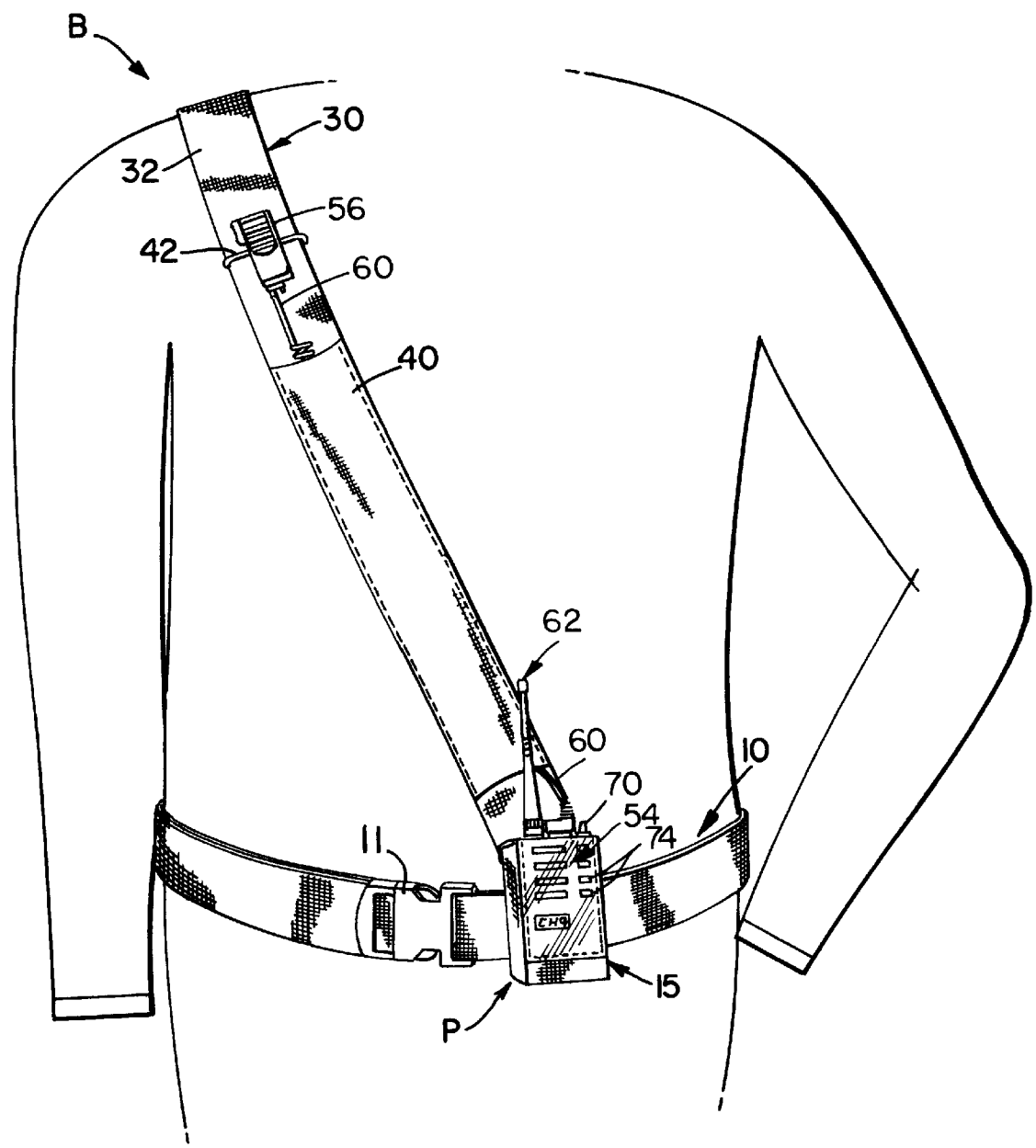
FIG. 3 is a front elevational view of the portable communication device secured within the belt harness of the present invention.

Now that the structural details of belt harness B have been described, belt harness B will now be described as it is used with a portable communication device. With reference now to FIG. 3, the portable communication device P to be used with belt harness B includes a receiver 54 and a transmitter 56. The receiver 54 includes connecting wires 60, antenna 62, and a volume button 70. The front face of the portable communication device P includes operative buttons such as channel changers 74.

In operation, the receiver 54 is placed into receptacle compartment 15 such that the front face of the receiver 54 is adjacent the front vertical portion 16. In this way, the operative features of the receiver 54 (e.g. channel changers 74) may be manipulated through the clear plastic material 21. In addition, the volume button 70, connecting wires 60, and antenna 62 penetrate through the apertures 22 such that they protrude from the receptacle compartment 15, while the receiver 54 remains secured in the receptacle compartment 15.

After receiver 54 is placed into receptacle compartment 15, the lid 23 of receptacle compartment 15 may be closed such that Velcro portions 24 and 26 are engaged. Thus, the receiver 54 is held securely within the receptacle compartment 15 while the connecting wires 60, antenna 62, and volume button 70 may be appropriately accessed. For instance, the volume button 70, because it protrudes from apertures 22, may be readily operated by the user, without having to remove the receiver 54 from its secured location.

In addition, antenna 62 is freely accessible to receiver transmissions. In FIG. 3, antenna 62 is shown as being relatively short in length and may remain outside the channel portion 40 without obstructing the freedom of movement of a user.

However, the connecting wires 60 and a longer antenna 62, if not secured, may obstruct the freedom of movement of the user. Thus, as the connecting wires 60 and antenna 62 extend through apertures 22, they may be secured through channel portion 40. The channel portion 40 may be long enough to completely secure antenna 62 within it, without the antenna 62 protruding from its other end. Thus, connecting wires 60 and antenna 62 may be removed from the range of motion of the user, so that the user may move freely without becoming entangled with the connecting wire 60 and an exposed antenna 62. Similarly, it is necessary that connecting wires 60 be long enough so that they extend out of channel portion 40 so that transmitter 56 may be attached to strap 42.

In addition, the user can transmit messages by way of transmitter 56, without having to remove any instrument from its respective support. Thus, the entire device is secured within the belt harness B and may be accessed without moving or removing any instrument from the belt. The belt harness B of the present invention is useful to anyone using a communication device. More particularly, this invention is especially useful to people communicating with a communication device while in transit.

Having described this specific preferred embodiment for the present invention, it should be appreciated that the present invention is not limited to those precise embodiments, and that various changes and modifications can be effected therein by one of ordinary skill in the art, without departing from the spirit or scope of the invention as defined by the appended claims.

I claim:

1. A belt harness for carrying and securing a portable communication device about a body of a user, comprising:
   a. a pelvic belt for securement about the body of a user;
   b. a receptacle compartment secured to said pelvic belt, said receptacle compartment for holding a receiver of the communication device said receptacle compartment including a front vertical portion, a rear vertical portion two side vertical portions and a base portion, said front vertical portion being made from a clear plastic material so that items within said receptacle compartment may be manipulated through said plastic material;
   c. a shoulder strap with first and second portions, said first and second portions of said shoulder strap being secured to said pelvic belt at opposing locations so that said pelvic belt is supported about the body of the user; and
   d. a continuous channel portion disposed along an outer surface of said first portion of said shoulder strap, said channel portion for securing features of the communication device and extending a substantial length of said first portion.

2. The belt harness of claim 1, further comprising:
   a. a strap disposed proximate to said channel portion for clipping a transmitter of the communication device about said strap.

3. The belt harness of claim 2, wherein;
   a. said strap is positioned horizontally.

4. The belt harness of claim 1, further comprising:
   a. a lid to cover and secure the receiver within said receptacle compartment.

5. The belt harness of claim 4, further comprising:
   a. means for securing said lid to said receptacle compartment.

6. The belt harness of claim 1, wherein;
  a. said receptacle compartment includes a plurality of apertures disposed along the front vertical portion of said receptacle compartment.

7. The belt harness of claim 1, wherein;
  a. the belt harness is made from acrylic polyester.

8. The belt harness of claim 1, further comprising:
  a. means for adjusting said pelvic belt.

9. A method of securing a portable radio apparatus within a harness, comprising the steps of:
  a. providing a belt harness including a pelvic belt, a shoulder strap attached to the belt, a receptacle compartment secured to the belt, and a channel portion secured to a front portion of the shoulder strap;
  b. positioning a receiver of a communication device within the receptacle compartment so that the operative features of the receiver may be manipulated through a front plastic material of the receptacle compartment;
  c. securing wires of the communication device within the channel portion of the shoulder strap; and
  d. securing a transmitter of the communication device to a portion of the belt harness above the channel portion so that the transmitter is proximate to a user's mouth.

\* \* \* \* \*